Patented Sept. 23, 1952

2,611,692

UNITED STATES PATENT OFFICE 2,611,692

PROCESS FOR THE PRODUCTION OF ALNICO INGOT FROM MANUFACTURING WASTES

Marvin Pesses, Rock Island, Ill., assignor to Alter Company, Davenport, Iowa, a corporation of Iowa No Drawing. Application January 14, 1952,
Serial No. 266,452

5 Claims. (Cl. 75—53)

1

The present invention relates to the recovery of magnet alloys from waste metal lost in magnet production.

Alloys of the type here referred to contain from thirty-five per cent (35%) to seventy per cent (70%) of iron, with the remainder being aluminum and nickel, and, if desired, cobalt and copper. The aluminum and nickel are each present in amount between five per cent (5%) and thirty per cent (30%). Copper, when present, is employed in amount less than ten per cent (10%). Cobalt, when present, is in amount less than thirty per cent (30%).

There are two principal sources of such scrap. The first source is grindings, which are contaminated with a high percentage of alumina derived from the abrasive which is employed. The second source is skimmings, which occur in the form of solid metal globules encased in highly refractory metal oxides, principally alumina. While both the grindings and skimmings contain a high percentage of metal, satisfactory results are not obtainable merely by attempting to melt down this scrap.

In accordance with the present invention, scrap magnet alloy, in which a portion of the alloy metal is in oxidized state, is melted with aluminum metal in amount sufficient to react with the metal oxides present, with the exception of aluminum oxide, preferably in amount stoichiometrically equivalent thereto. Use of a slight excess will replace aluminum of the alloy which has been oxidized. There are further added to the melt sodium oxide and silica in amount to yield with the alumina present, both originally in the scrap and produced by reaction with the metal oxides, a flux equivalent to albite $(Na_2OAl_2O_36SiO_2)$ 

The melting is effected in a high frequency induction furnace, preferably having a basic lining.

It is desirable for best results to clean the grindings with a solvent to remove organic material with which the grindings become contaminated during the grinding operation. Likewise, it is desirable to grind the skimmings in a hammer mill type of pulverizer. Both may then be passed through a magnetic separator to effect an initial classification.

The amount of aluminum to be added is readily determinable by standard analytical methods for determining the nickel, cobalt, and iron oxides present, and copper oxide, if any. The amount of aluminum to be employed is that computed to yield the other metal and aluminum oxide.

The amount of sodium oxide and silica to be employed are readily determinable from the amount of alumina so formed and the amount of alumina originally present. It is of course convenient to add the sodium oxide in the form of sodium silicate with the remainder of the silica being added as such.

The melting, as indicated, is conducted in a high frequency induction furnace. This is the only type of furnace which has proven satisfactory for the present operation. Both oil heated and electric arc furnaces have given unsatisfactory results, despite the fact that sufficiently high temperatures are obtainable. The satisfactory results obtained with an induction furnace appear to be due, perhaps, to a combination of ability to melt the metal within the highly refractory oxide coating and of the agitation obtained in such a furnace, whereby high rates of reaction are obtained. The melt is preferably held at a temperature of at least three thousand degrees (3000°) Fahrenheit, but less than three thousand five hundred degrees (3500°) Fahrenheit. The optimum temperature appears to be in the range between three thousand one hundred degrees (3100°) Fahrenheit and three thousand one hundred seventy-five degrees (3175°) Fahrenheit. The melt is generally held at this temperature for a short time as, for example, over one minute to allow it to come to equilibrium and thereby to effect the desired refining.

At this time, the melt in the furnace is present as two well-defined layers, the lower of which is the recovered alloy and the upper is a flux layer. The flux is then poured off and, if desired, a small amount of iron oxide may then be added to the molten metal, generally in amount less than one per cent (1%). The iron oxide acts as a scavenger for free carbon and free silicon in the alloy, thereby effecting further fining thereof, with the liberation of carbon monoxide and silica. The metal is then either pigged or cast in the forms desired.

In addition to affording high recovery from low grade materials, the present process functions to reduce materially the amount of chromium, manganese, titanium, and zinc frequently present in scrap of the indicated type, which contaminates are undesirable as components of magnet alloys.

The following examples will serve to illustrate the present invention, but should not be taken as definitive thereof.

Example 1

1050 pounds of "Alnico V" skimmings were processed. "Alnico V" is an alloy of the following composition:

| | |
|---|---|
| Al | 8.0 |
| Ni | 14–15 |
| Co | 23–24 |
| Cu | 3.0 |
| Fe | 50.0 |

This alloy generally contains, as impurities, about one one-hundredths per cent (0.01%) each of carbon and silicon. The skimmings were ground and magnetically separated, whereby a concentrate of 1000 pounds was obtained which had the following average composition:

| | |
|---|---|
| Al | 7.5 |
| Ni | 13.0 |
| Co | 23.0 |
| Cu | 3.0 |
| Fe | 47.5 |
| CoO, NiO, FeO | 3.5 |
| $Al_2O_3$ | 2.5 |

The powder was mixed with nine pounds of aluminum shot, 53.5 pounds of sodium silicate (containing 23.5% $Na_2O$ and the balance silica) and 27 pounds of silica. The mixture was then melted in a furnace, as described, and the melt held for five to eight minutes. The flux was then skimmed off and five pounds of ferric oxide were added. The melt was then pigged and found to have the following analysis:

| | Per cent |
|---|---|
| Al | 7.97 |
| Ni | 14.03 |
| Co | 24.90 |
| Cu | 3.08 |
| Fe | 50.10 |
| C | 0.02 |
| Si | 0.02 |

*Example 2*

1050 pounds of skimmings of the same alloy as in Example 1 were reclaimed. These skimmings had become contaminated with 0.10% Cr; 0.10% Ti; 0.10% Mn; 0.4% Si; 0.1% C; and 0.1% Zn, present after magnetic separation.

The same method was followed as stated in Example 1, with the product having the following analysis:

| | Per cent |
|---|---|
| Al | 7.85 |
| Ni | 14.10 |
| Co | 24.45 |
| Cu | 3.25 |
| Fe | 50.30 |
| C | 0.04 |
| Si | 0.08 |
| Cr | 0.04 |
| Mn | 0.03 |
| Ti | 0.04 |

*Example 3*

1370 pounds of dry grindings of Alnico V were washed with ethylene trichloride and dried, leaving 1320 pounds of material. This was magnetically separated, whereby 1000 pounds of classified material was produced, which material had the following average composition:

| | Per cent |
|---|---|
| Al | 5.61 |
| Ni | 9.98 |
| Co | 17.43 |
| Cu | 3.25 |
| Fe | 36.68 |
| CoO, CuO, NiO, FeO | 19.74 |
| $Al_2O_3$ | 7.51 |

This was mixed with 51 pounds of aluminum shot, 161 pounds of sodium silicate (23.5% $Na_2O$) and 81 pounds of silica. This was melted, separated, scavenged with $Fe_2O_3$ as in Example 1. The product had the following analysis:

| | Per cent |
|---|---|
| Al | 8.07 |
| Ni | 13.89 |
| Co | 24.68 |
| Cu | 2.90 |
| Fe | 50.48 |

*Example 4*

Skimmings were processed in accordance herewith, the alloy, the skimmings, and the processed product having the following analyses, in each case the balance being iron:

| | Al | Ni | Co | Cu | (¹) | $Al_2O_3$ |
|---|---|---|---|---|---|---|
| Original alloy | 12 | 20–22 | 5 | 2 | | |
| Skimmings | 10.95 | 19.78 | 4.66 | 1.88 | 3.40 | 2.81 |
| Processed product | 11.87 | 21.34 | 5.02 | 2 | | |

¹ Oxides other than $Al_2O_3$.

In the processing, 1050 pounds of skimmings were employed, together with 8.75 pounds aluminum, 60 pounds of sodium silicate (23.5% $Na_2O$) and 30 pounds of silica. Otherwise, the method of Example 1 was followed.

*Example 5*

Skimmings were processed in accordance herewith, the alloy, the skimmings, and the processed product having the following analyses, in each case the balance being iron:

| | Al | Ni | Co | Cu | (¹) | $Al_2O_3$ |
|---|---|---|---|---|---|---|
| Original alloy | 10 | 17 | 12–12.5 | 6 | | |
| Skimmings | 8.93 | 15.67 | 11.17 | 5.53 | 4.78 | 3.47 |
| Processed product | 10.27 | 17.17 | 12.35 | 5.92 | | |

¹ Oxides other than $Al_2O_3$.

The process described in Example 1 was employed, using 1050 pounds of skimmings, 12.25 pounds of aluminum, 74.25 pounds of sodium silicate (23.5% $Na_2O$) and 37.5 pounds of silica.

*Example 6*

In another run, the alloy, skimmings, and processed product had the following analyses, the balance being iron:

| | Al | Ni | (¹) | $Al_2O_3$ |
|---|---|---|---|---|
| Original alloy | 12 | 25 | | |
| Skimmings | 10.83 | 23.28 | 4.38 | 3.05 |
| Processed product | 12.18 | 25.29 | | |

¹ Oxides other than $Al_2O_3$.

The process of Example 1 was employed, using 1050 pounds of skimmings, 11.25 pounds of aluminum, 65.25 pounds of sodium silicate (23.5% $Na_2O$) and 33 pounds of silica.

*Example 7*

Analyses of another run are as follows, the balance being iron:

| | Al | Ni | Co | Cu | (¹) | $Al_2O_3$ |
|---|---|---|---|---|---|---|
| Original alloy | 12 | 27–28 | 5 | 2 | | |
| Skimmings | 10.47 | 25.61 | 4.61 | 1.86 | 4.72 | 2.91 |
| Processed product | 11.93 | 27.92 | 5.11 | 1.98 | | |

¹ Oxides other than $Al_2O_3$.

The process of Example 1 was employed, using 1050 pounds of skimmings, 12 pounds of aluminum, 62.25 pounds of sodium silicate (23.5% Na₂O) and 31.5 pounds of silica.

Having now described and illustrated the present invention, that which I claim is as follows:

1. The method of reclaiming scrap ferrous alloy metal containing aluminum and nickel, contaminated with impurities in the form of metal oxides, including aluminum oxides, which method comprises melting said scrap metal with aluminum in amount sufficient to react with the metal oxide impurities, exclusive of aluminum oxide, together with sodium oxide and silica in amount sufficient to form a low melting sodium aluminum silicate with the aluminum oxide present in said scrap and produced by reaction of said aluminum, holding said melt at a temperature above three thousand degrees (3000°) Fahrenheit, separating the flux formed from the molten metal, and casting the metal so reclaimed.

2. The method in accordance with claim 1 in which the aluminum is employed in amount stoichiometrically equivalent to said metal oxides exclusive of aluminum.

3. The method in accordance with claim 1 in which the sodium oxide and silica are in amount to produce a flux of the composition of albite.

4. The method in accordance with claim 1 in which the sodium oxide is added in the form of sodium silicate.

5. The method in accordance with claim 1 in which the melting is conducted in a high frequency induction furnace.

MARVIN PESSES.

REFERENCES CITED

The following references are of record in the file of this patent:

UNITED STATES PATENTS

| Number | Name | Date |
| --- | --- | --- |
| 82,194 | Baker | Sept. 15, 1868 |